United States Patent
Johnston

(10) Patent No.: US 10,735,586 B1
(45) Date of Patent: Aug. 4, 2020

(54) SYSTEM AND METHOD OF SENTIMENT MODELING AND APPLICATION TO DETERMINE OPTIMIZED AGENT ACTION

(71) Applicant: Verint Americas Inc., Alpharetta, GA (US)

(72) Inventor: Michael Johnston, Alpharetta, GA (US)

(73) Assignee: Verint Americas Inc., Alpharetta, GA (US)

(*) Notice: Subject to any disclaimer, the term of this patent is extended or adjusted under 35 U.S.C. 154(b) by 0 days.

(21) Appl. No.: 16/713,813

(22) Filed: Dec. 13, 2019

Related U.S. Application Data

(63) Continuation of application No. 16/653,258, filed on Oct. 15, 2019.

(51) Int. Cl.
| | |
|---|---|
| *H04M 3/00* | (2006.01) |
| *H04M 3/51* | (2006.01) |
| *G06F 40/30* | (2020.01) |
| *G10L 15/18* | (2013.01) |

(52) U.S. Cl.
CPC .......... *H04M 3/5175* (2013.01); *G06F 40/30* (2020.01); *H04M 3/5183* (2013.01); *G10L 15/1815* (2013.01)

(58) Field of Classification Search
CPC .............. H04M 3/5175; H04M 3/5183; G10L 15/1815
USPC ....... 379/265.01–265.14, 265.01–265.1, 309
See application file for complete search history.

(56) References Cited

U.S. PATENT DOCUMENTS

| | | | | |
|---|---|---|---|---|
| 9,495,425 B1* | 11/2016 | Kuznetsov | ............ | G06F 16/435 |
| 10,216,850 B2* | 2/2019 | Kazi | .................. | G06Q 30/0251 |
| 10,326,881 B2* | 6/2019 | Slovacek | ............ | H04M 3/5175 |
| 10,515,156 B2* | 12/2019 | Wooters | .................. | G06F 40/35 |
| 10,567,580 B1* | 2/2020 | Montenegro | ........ | G06Q 30/016 |
| 10,592,949 B2* | 3/2020 | Kannan | ................ | G06Q 30/016 |
| 2007/0185925 A1* | 8/2007 | Prahlad | ............. | G06F 16/24575 |
| 2012/0191716 A1* | 7/2012 | Omoigui | ............. | H01L 27/1463 707/740 |
| 2014/0122188 A1* | 5/2014 | Van Pelt | .......... | G06Q 10/06398 705/7.42 |
| 2014/0337072 A1* | 11/2014 | Tamblyn | .......... | G06Q 10/06311 705/7.13 |
| 2015/0117632 A1* | 4/2015 | Konig | ................. | H04M 3/5233 379/265.12 |

(Continued)

*Primary Examiner* — William J Deane, Jr.
(74) *Attorney, Agent, or Firm* — Christopher M. Scherer; DeWitt LLP

(57) ABSTRACT

The present invention is a system and method of continuous sentiment tracking and the determination of optimized agent actions through the training of sentiment models and applying the sentiment models to new incoming interactions. The system receives conversations comprising incoming interactions and agent actions and determines customer sentiment on a micro-interaction level for each incoming interaction. Based on interaction types, the system correlates the determined sentiment with the agent action received prior to the sentiment determination to create and train sentiment models. Sentiment models include agent action recommendations for a desired sentiment outcome. Once trained, the sentiment models can be applied to new incoming interactions to provide CSRs with actions that will yield a desired sentiment outcome.

20 Claims, 3 Drawing Sheets

(56) References Cited

U.S. PATENT DOCUMENTS

2016/0050529 A1* 2/2016 Hassan ................ H04W 4/023
  709/203
2016/0378569 A1* 12/2016 Ristock ................ G06F 9/5083
  718/104

* cited by examiner

SYSTEM AND METHOD OF SENTIMENT MODELING AND APPLICATION TO DETERMINE OPTIMIZED AGENT ACTION

CROSS-REFERENCE TO RELATED APPLICATIONS

The present application is a continuation of U.S. application Ser. No. 16/653,258, filed Oct. 15, 2019, the content of which is incorporated herein by reference in its entirety.

FIELD

The present disclosure is directed to systems and methods of model creation through machine learning and application. Specifically, systems and methods of continuous sentiment tracking and creating sentiment models based on machine learning and to determine an optimized agent action for new interactions by applying the sentiment models.

BACKGROUND

In modern high-volume customer engagement centers (CEC), there are a number of ways communication between a customer service representative (CSR) and a customer can take place. For example, communication in a CEC can take place over the telephone, through email, and text chat, among other known communication methods. Further it is often the case that a customer contact or communication requires a wide variety of communication protocols and resources. It is extremely important for a CEC system to provide CSRs with accurate and helpful guidance for servicing the incoming customer communications routed to them and keeping the customer pleased with the service provided.

There are a number of methods and systems designed to assist in providing guidance to CSRs to assist in servicing the incoming customer communication. Typically, these methods and systems receive initial data regarding the incoming communication and determine how to provide recommendations based on that initial data and a set of static generalized rules. Some systems may save customer sentiment from prior conversations and use prior customer sentiment in conjunction with the initial data to assist in determining the recommendations. However, the customer sentiment in those systems is typically determined at the end of the conversation and is an overall sentiment depiction for the conversation or is a final sentiment depiction at the end of the conversation and is not connected to a particular CSR action, but connected to the conversation as a whole. Further, these known systems do not focus on the customer sentiment to make the recommendation, the sentiment is merely one of many components to be used in the recommendation.

For example, the system may receive an incoming communication from a customer, when determining a recommendation to make to the CSR, the system may determine that the customer's sentiment during the last conversation was a negative sentiment. Therefore, the system may determine that the current interaction should not be routed to the same CSR as the last conversation, or the system may determine that the customer should be offered a discount or some other sort of compensation due to the prior dissatisfactory communication that lead to the negative sentiment.

These systems, however, are not able to provide the CSR with continuous sentiment tracking in real-time throughout the conversation. Further, these systems are not able to correlate specific individual agent responses and actions to the customer's sentiment to teach the system which agent responses/actions result in a sentiment change.

SUMMARY

There is an unmet need in the art for a system capable of providing CSRs with the customer's current sentiment in real-time throughout the conversation based on each interaction in the conversation. There is further an unmet need in the art for a system capable of analyzing customer sentiment in conjunction with the prior CSR action to correlate the interaction type and/or conversation type with CSR actions and change in customer sentiment. An object of the present invention is to overcome these unmet needs.

The present invention is a system and method of continuous sentiment tracking and the determination of optimized agent actions through the training of sentiment models and applying the sentiment models to new incoming interactions. The system receives conversations comprising incoming interactions and agent actions and determines customer sentiment on a micro-interaction level for each incoming interaction. Based on interaction types, the system correlates the determined sentiment with the agent action received prior to the sentiment determination to create and train sentiment models. Sentiment models include agent action recommendations for a desired sentiment outcome. Once trained, the sentiment models can be applied to new incoming interactions to provide CSRs with actions that will yield a desired sentiment outcome.

When interacting with a customer, the actions an agent takes may change the customer's mood, causing the customer to become happier, unhappy, angry, excited, etc. By tracking the mood of the customer and correlating it with the actions that are taken by the agent the system can learn what actions have the biggest influence (positive or negative) on customer mood. The system can then recommend to agents what actions to take in future interactions, and what actions to avoid. This information will help shorten conversations, and increase the customers happiness and satisfaction.

Customer Interactions can take place over multiple channels, phone, text chat, email. By using analytics (voice analytics and text analytics) the system can determine customer sentiment. By analyzing the micro interactions of a conversation, such as each individual message, each sentence spoken, the system can determine how customer sentiment changes throughout the interaction. Further, using analytics the system can categorize the interaction and assigning it to a "topic" by matching keywords or key phrases to the topic categories. For example, correlating it with a product or service, or a type of interaction such as returns, purchases, complaints, requests, etc.

When an agent interacts with a customer, the system can record the agent's response and the agent's actions for analysis, including what applications they used, and what they did within each application, a recording/transcript of their response in the conversation. By correlating the customer sentiment with the actions taken by the agent the system can learn and build statistical models that show what actions are more likely to result in positive or negative swings in customer sentiment. This data is then useful for influencing the future actions of agents, to improve their productivity and to take correct actions sooner in a conversation.

As an interaction with a customer progresses the topic may change, and the customer mood (determined by sentiment analysis) may change. By tracking the language in a conversation and the sentiment change at a micro-interaction level (i.e. each individual interaction within a conversation, each sentence, each agent action, each customer response, etc.) the system can develop rich models of how an action or a word used in the conversation might influence the customer sentiment.

The system can present the agent with the current sentiment of the customer and how it changes through the conversation in real-time/near real-time. This allows the agent to see changes in the customer mood, and take corrective action early. Further the system can recommend actions to the agent in real-time/near real-time that might improve the customer mood, and make the agent aware of words or actions that might cause a negative change in the customer mood. This allows the agent to better manage the conversation and improve customer satisfaction. The types of recommendations the system may provide include, but are not limited to, the agent actions that generated the largest change in customer sentiment for the same type of interaction, recommending different scripts or updated language for a script depending on the sentiment associated with use of that script or updated language.

An embodiment of the present application includes a method for automatedly providing continuous sentiment analysis and optimized agent actions. A set of conversations is received at a model analysis engine (MAE). Each conversation of the set of conversations includes a set of incoming interactions along with a sentiment for each incoming interaction and a set of agent actions. The MAE analyzes each of the agent actions for each of the conversations to determine an interaction type for each of the agent actions. The MAE performs a model analysis of each coupled agent action in each of the conversations to correlate agent actions with each sentiment for each interaction type. Each coupled agent action includes one of the agent actions from one of the conversations and the sentiment assigned to a next incoming interaction for the conversation. The next incoming interaction is the incoming interaction for the conversation immediately preceding the agent action for the coupled agent action. The MAE creates at least one sentiment model for each interaction type that does not already have a sentiment model based on the model analysis. The sentiment model includes at least one optimized agent action and an interaction type. The MAE updates the sentiment models for each interaction type based on the model analysis. A recommendation analysis engine (RAE) receives a new incoming interaction along with associated sentiment for the new incoming interaction. The RAE also receives the sentiment models from the MAE. The RAE determines the interaction type for the new incoming interaction and the sentiment models to the new incoming interaction to determine an optimized agent action for the interaction type of the new incoming interaction. The RAE displays to a customer service representative the sentiment for the new incoming interaction and the determined optimized agent action.

Another embodiment of the present application is a n automated computer system for automatedly providing continuous sentiment analysis and optimized agent actions. The system includes a processor, at least one display and a non-transitory computer readable medium programmed with computer readable code that upon execution by the processor causes the processor to execute the above-mentioned method for automatedly providing continuous sentiment analysis and optimized agent actions.

Another embodiment of the present application is a non-transitory computer readable medium programmed with computer readable code that upon execution by a processor causes the processor to execute the above-mentioned method for automatedly providing continuous sentiment analysis and optimized agent actions.

Another embodiment of the present application is a method for processing interactions to provide continuous sentiment analysis and optimized agent actions. An incoming interaction and relation metadata associated with the incoming interaction is received. The incoming interaction is part of a conversation. An analysis of the incoming interaction is performed to create interaction metadata for the incoming interaction and, based on the interaction metadata and sentiment criteria, assign a sentiment to the incoming interaction. Further, an agent action with relation metadata associated with the agent action in response to the incoming interaction is received. The agent action is part of the conversation. An analysis of the agent action is performed to create interaction metadata for the agent action. It is determined if the conversation is ended by analyzing the conversation. Additional incoming interactions and additional agent actions are received and analyzed until the conversation is ended. The additional incoming interactions and the additional agent actions are part of the conversation. A MAE receives the conversation when the conversation is ended. The MAE performs model analysis of each coupled agent action in the conversation to correlate the coupled agent actions for each interaction type in the conversation. Each of the coupled agent actions includes one of the agent actions from the conversation and the sentiment assigned to a next incoming interaction for the conversation. The next incoming interaction is the incoming interaction that immediately precedes the agent action for the coupled agent action. The MAE creates at least one sentiment model for each interaction type that does not already have a sentiment model based on the model analysis. The sentiment model includes at least one optimized agent action and an interaction type. The MAE updates the sentiment models for each interaction type based on the model analysis. A RAE receives a new incoming interaction along with associated sentiment for the new incoming interaction. The RAE also receives the at least one sentiment model. The RAE determines the interaction type for the new incoming interaction and applies the at least one sentiment model to the new incoming interaction to determine an optimized agent action for the interaction type of the new incoming interaction. The RAE displays to a customer service representative the sentiment for the new incoming interaction and the determined optimized agent action.

Another embodiment of the present application is an automated computer system for automatedly processing interactions to provide continuous sentiment analysis and optimized agent actions. The system includes a processor, at least one display and a non-transitory computer readable medium programmed with computer readable code that upon execution by the processor causes the processor to execute the above-mentioned method for processing interactions to provide continuous sentiment analysis and optimized agent actions.

Another embodiment of the present application is a non-transitory computer readable medium programmed with computer readable code that upon execution by a processor causes the processor to execute the above-mentioned method for processing interactions to provide continuous sentiment analysis and optimized agent actions.

Another embodiment of the present application includes a method for processing conversations to provide continuous sentiment analysis and optimized agent actions. An incoming interaction and relation metadata associated with the incoming interaction is received at a metadata analytics service (MAS). The incoming interaction is part of a conversation. The MAS performs an analysis of the incoming interaction using a MAS software module. The MAS generates interaction metadata for the incoming interaction based on the analysis of the MAS software module. The MAS passes the incoming communication, the relation metadata and the interaction metadata associated with the incoming interaction to a sentiment analysis engine (SAE). The SAE performs an analysis of the incoming interaction using a SAE software module based on the interaction metadata and a set of sentiment criteria. The SAE assigns a sentiment to the incoming interaction based on the SAE analysis. An agent action with relation metadata associated with the agent action in response to the incoming interaction is received. The agent action is part of the conversation. The MAS performs an analysis of the agent action using the MAS software module. The MAS generates interaction metadata for the agent action based on the analysis of the MAS software module. The MAS continues to receive and analyze additional incoming interactions and additional agent actions until the conversation is ended. The additional incoming interactions and the additional agent actions are part of the conversation. A MAE receives the conversation when the conversation is ended. The MAE performs an analysis of the agent actions from the conversation along with the sentiment assigned to the incoming interactions from the conversation to create at least one sentiment model, wherein the sentiment model includes at least one optimized agent action and an interaction type. A RAE receives a new incoming interaction along with associated sentiment for the new incoming interaction. The RAE also receives the at least one sentiment model at the RAE. The RAE applies the at least one sentiment model to the new incoming interaction to determine an optimized agent action. The RAE displays to a customer service representative the sentiment for the new incoming interaction and the determined optimized agent action.

Another embodiment of the present application is an automated computer system for automatedly processing conversations to provide continuous sentiment analysis and optimized agent actions. The system includes a processor, at least one display and a non-transitory computer readable medium programmed with computer readable code that upon execution by the processor causes the processor to execute the above-mentioned method for processing conversations to provide continuous sentiment analysis and optimized agent actions.

Another embodiment of the present application is a non-transitory computer readable medium programmed with computer readable code that upon execution by a processor causes the processor to execute the above-mentioned method for processing conversations to provide continuous sentiment analysis and optimized agent actions.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

Figure 1:
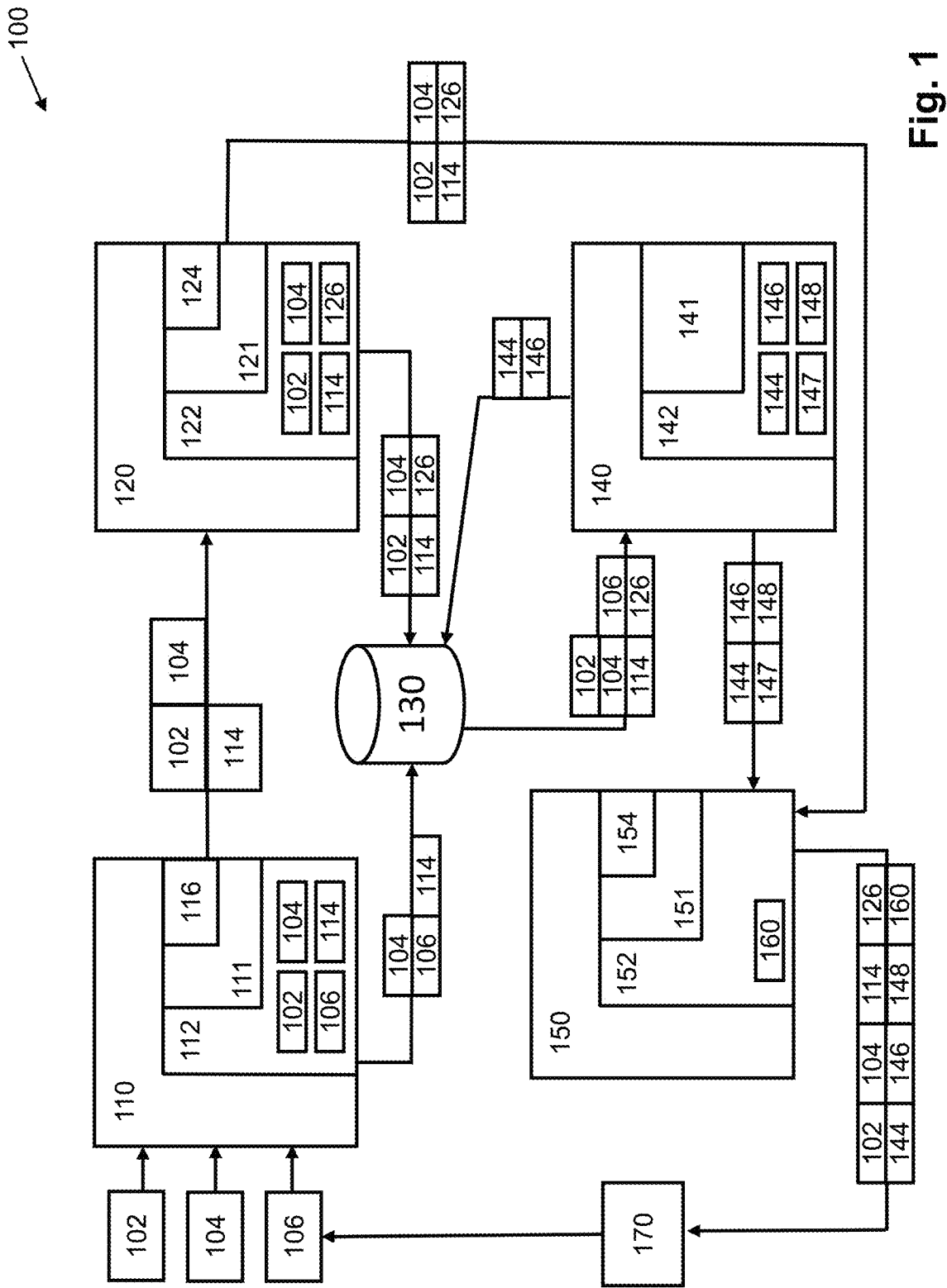
FIG. 1 depicts an exemplary embodiment of a CEC system for creating sentiment models based on machine learning and determining an optimized agent action for new interactions by applying the sentiment models.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By providing a system that can determine customer sentiment on a micro-interaction level and learn from those interactions to create sentiment models that, when applied to new interactions can provide agents with recommended actions, the CEC system can allow an organization to achieve several key benefits. These benefits will be increased through the dynamic and continued updating of the sentiment models. First, the system will provide the agent with the customer's mode (sentiment) throughout the conversation, which will enable the agent to address a negative sentiment early in the conversation. Second, the CEC system's ability to learn and create sentiment models and apply those models to new interactions will allow for shorter conversations, better agent productivity, and increase customer satisfaction. Third, the CEC system's adaptive and learning nature allows it to develop more accurate and precise sentiment models over time.

Embodiments of the methods and systems disclosed herein include a training portion and an application portion. In the training portion, the system analyzes conversations (which include related incoming interactions, customer sentiment for the related incoming interactions, and related agent actions) to learn correlations between the cause and effect of agent actions on customer sentiment and create sentiment models based on the learned correlations. The training portion of the system can occur in real-time/near real-time one conversation at a time, can occur in batches where an amount of prior conversations are analyzed at one time, or a combination of both. The training portion uses a MAS to create interaction metadata for the incoming interactions and agent actions, a SAE to assign sentiment to the incoming interactions, and a MAE to learn from the conversations and create sentiment models. In the application portion, the system automatedly provides agents with ongoing sentiment updates during the course of a conversation (on an interaction by interaction basis) and automatedly provides agents with guidance for agent actions in response to the current incoming interaction. The guidance provided is based on applying the appropriate sentiment models to the current incoming interaction. The application portion of the system occurs in real-time/near real-time of a customer/agent conversation. The application portion uses a MAS to create interaction metadata for the incoming interactions, a SAE to assign sentiment to the incoming interaction, and a RAE to apply sentiment models to the incoming interaction and provide the agent with sentiment for the incoming interaction and guidance for the incoming interaction.

In embodiments, it is desirable for the system to automatedly (without human involvement) update the sentiment models used by the CEC system to be applied to new incoming interactions. This permits the system to adapt to changes in customer sentiment responses to agent actions. The more data points the system has to analyze for each sentiment model the more accurate the model will depict the likely outcome. In an embodiment the system will update the applicable sentiment models each time a new conversation occurs. In another embodiment, it is desirable to update the sentiment models based on batches of conversations that have occurred. In still further embodiments, it is desirable to use batches of old conversations to initially train the sentiment models and then to revise the sentiment models based on each new conversation that occurs.

FIG. 1 depicts an exemplary embodiment of CEC system 100 for creating sentiment models based on machine learning and determining an optimized agent action for new interactions by applying the sentiment models.

CEC system 100 includes a MAS unit 110 having a MAS software component 111 and an optional MAS storage 112. MAS unit 110 may be a processor or a combination of a processing system and a storage system. MAS unit 110 receives incoming interactions 102 and agent actions 106 along with relation metadata 104 associated with the incoming interactions 102 and agent actions 106. Incoming interactions 102 and agent actions 106 are components of conversations. The MAS unit 110 analyzes the incoming interactions 102 with the associated relation metadata 104 and the agent actions 106 with the associated relation metadata 104 using MAS software component 111 to generate interaction metadata 114. Optionally, MAS unit 110 may also pass a copy of the incoming interaction 102, agent action 106, relation metadata 104, and/or interaction metadata 114 to internal or external MAS storage 112 for permanent or temporary storage. Optionally, the MAS unit 110 stores analyzed agent actions 106, relation metadata 104, and interaction metadata 114 in a conversation database 130 for further analysis. In embodiments, the MAS unit 110 receives incoming interactions 102, relation metadata 104, and agent actions 106 in real-time or near real-time. In embodiments, the MAS unit 110 receives incoming interactions 102, relation metadata 104, and agent actions 106 in batches for analysis. In embodiments, the MAS unit 110 receives some incoming interactions 102, relation metadata 104, and agent actions 106 in batches and other incoming interactions 102, relation metadata 104, and agent actions 106 in real-time or near real-time for immediate processing.

A conversation is a string of related interactions. The conversation may be a new conversation, where the incoming interaction 102 is not related to any other prior interaction, or part of an ongoing conversation, where the incoming interaction 102 is related to at least one other interaction (either an incoming interaction 102 or an agent action 106). Conversations may contain synchronous interactions (e.g. telephone call, text chat), asynchronous interactions (e.g. emails, text message (short message service (SMS), multimedia messaging service (MMS)), letters) or a combination of both. A system will have many conversations. Even a single incoming interaction 102 that never has an agent action 106 related to it (which theoretically should never happen) would be a conversation on its own, it just would not have any other interactions related to it. Typically, all incoming interactions 102 should have at least one agent action 106 related to the incoming interaction 102. Most conversations will have numerous related incoming interactions 102 and agent actions 106.

The CEC system 100 may use numerous methods of relating interactions to form conversations. An interaction may be an incoming interaction 102 or an agent action 106. Synchronous interactions (e.g. phone call, text chat—where participants respond in real time) generally commence with a connection action and end with a disconnection action. All interactions between the connection and disconnection would be related interactions. Asynchronous interactions (text message, emails, letters) may typically contain an identifier that would chain the interactions into a conversation (for example, same subject assigned on the first response that's included in future responses, message id, tweet id). When the system receives a new interaction, if there is a recognized ID in the message or in its metadata, those interactions are related and considered part of the same conversation. Conversations with interactions that occur across channels (e.g. phone call with an email sent during the phone call, asynchronous email interactions that then has a text chat associated with it) may use a number of different methods of determining related interactions. In some embodiments, the system may utilize a database persisted list and/or table of one interaction ID mapped to another interaction ID with metadata and channel type such that a telephone conversation could be mapped to an email follow up so that the entire set of interactions would be considered a single conversation. Typically, the linking of interactions would be created by the CEC system 100 at the time of the interaction. In some embodiments, the system will know based on metadata, speech analytics, and text analytics, and system monitoring that a particular agent is on the phone with a particular customer, and that agent sent an email to the customer while you were on the phone with the customer, such that the phone conversation will be linked with the email as a single conversation. In other embodiments, the system may require interactions to be conducted through a specialized work area created by the system so that the system can monitor and created connections for the interactions. For example, an agent starts a conversation (answer a call, pick up an email) and the system creates a work area for the conversation, the agent performs multiple interactions (send emails, call another department) in this area which the system automatically associates with the conversation. To finish interacting the agent closes the workspace for this item and the CEC system 100 determines the conversation has been ended. If further interaction is needed for the conversation, the work area can be reopened. In other embodiments, the agent may also manually link interactions to form conversations. For example, a customer calls up about not receiving a refund that was requested by email, the agent searches the system for the email, the agent then may manually link the email to the current telephone call. Further the agent may then create a refund action and link all of the interactions together in the system in case you call again. It should be understood that these examples provided above could be used independently or in combination with each other. It should further be understood that these examples are simply examples and should not be considered limiting.

An interaction may be an incoming interaction 102 or an agent action 106. Each interaction would be considered a micro action and micro response in the conversation. For example, one interaction may be the initial text chat message from a customer (incoming interaction 102), the next interaction may be the text chat response from the CSR (agent action 106), or the next interaction may be another text chat message from the customer is a second message comes in prior to a response from the CSR (incoming interaction 102). In another example, one interaction may be the initial phrase a CSR speaks to the customer on a phone call (agent action 106), the next interaction may be a response from the customer (incoming interaction 102). In an asynchronous interaction, each interaction would be the asynchronous response. For example, a single email in a series of emails would be considered an interaction.

To enable the CEC system 100 to link interactions as described above, all interactions have relation metadata 104 associated with them to connect them to related incoming interactions 102 and agent actions 106 that make up a single conversation. Relation metadata 104 provides information about the interaction and related interactions. Relation metadata 104 may include information about the interaction including time of interaction, duration of interaction, action taken, CSR information for any CSRs related to the interaction, customer information for any customers related to the interaction, information on all related interactions, and links to all related interactions. It should be understood that these are merely examples of relation metadata 104, and should not be considered limiting. In some embodiments, the relation metadata 104 may be created by the CSR handling the call. For example, the CSR may receive an incoming interaction 102 from a customer and may access and review prior conversations and/or interactions involving the customer. Based on the review, the CSR may determine if the current incoming interaction 102 is related to any of the conversations and/or interactions for the customer. The agent review may simply be a review of the relation metadata 104 and interaction metadata 114 for the conversations. The review could also be listening to the prior conversations that appear relevant to the current incoming interaction 102. In other embodiments, the system determines the relation metadata 104 such that the current incoming interaction 102 is related to the correct conversation, if one exists. In still further embodiments, the system may determine the relation metadata 104, but the CSR may also be able to review and adjust the relation metadata 104. Since the CSR receives the incoming communication 102 in which they are responding to, any agent action 106 in response to an incoming interaction 102 will have relation metadata 104 automatically created linking the agent action 106 to the conversation for the current incoming interaction 102.

Agent actions 106 can be considered either outgoing interactions or other actions. An outgoing interaction is a interaction between an entity inside the CEC system 100 and an entity outside the CEC system 100, for example a CSR interacting with a customer, a supervisor interacting with a prospective customer, an automated response system in the CEC system 100 responding to an inquiry made by a customer. Typically, outgoing interactions are communications from a customer service representative sent to a party outside the CEC system, but could be sent by a supervisor, an automated reply system, or any other way of sending a communication from inside the CEC system. It should be understood that these are merely examples of the parties that may be involved in communications and should not be considered limiting.

Other actions are any action taken by an entity from inside the CEC system 100, other than an outgoing interaction, in response to an incoming interaction 102. Examples of other actions may include, but are not limited to, providing documents or other information to customers, processing a sales order, logging a complaint case, scheduling an appointment, updating the client's file based on the interaction, accessing knowledge articles (e.g. diagnosis steps, or article on how to update settings), etc. For example, an agent may receive an incoming interaction 102 and determine that the incoming interaction 102 should be routed to a different agent or a supervisor or in response to a question from a customer in the incoming interaction 102, the agent may access a script or other resource to relay information to the customer. The accessing of the script and transferring of the incoming interaction 102 would be considered an other action. In another example, an agent may tell the client he will schedule a follow-up call in the future and put a reminder in his calendar. The communication to the client that a follow-up will be scheduled is an outgoing interaction, but the actual scheduling of the follow-up is an other action. It should be understood that these are merely examples of other actions and should not be considered limiting. An other action may be a null action, meaning that there is no other action or outgoing interaction in response to the incoming interaction 102. For example, an incoming interaction 102 could end the conversation and not require any agent action 106 or response because the conversation has been ended by the incoming interaction 102. In that case, the agent 106 action may be a null action such as the agent hanging up the phone, the agent closing the chat window, etc. For example, the agent may provide the customer with an outgoing interaction that answers the customer's question and the last interaction in the conversation may be an incoming interaction 102 of the customer indicating that their questions have been answered. In that case no further agent action 106 is required by the agent as a reply.

Incoming interactions 102 are communications between an entity outside the CEC system and an entity inside the CEC system, for example, customers and CSRs, prospective customer and a supervisor, a person making an inquiry and an automated response system in the CEC system. Typically, incoming interactions are communications received from a customer, but could be received by prospective customers, individuals with inquires, or any other entity outside of the CEC system. It should be understood that these are merely examples of the parties that may be involved in communications and should not be considered limiting.

Incoming interactions 102 and outgoing interactions, may be audio communication such as a telephone call, a voice message, a video chat, or any other type of audio communication, written communication such as an email, an online posting, a direct message from a customer or CSR, or any other written or audio communication. The analysis of interactions may include a variety of techniques such as speech analytics or textual analytics of audio communications or textual communications between customers and CSRs. The interactions can further include a wide variety of channels of data. These channels can include audio or textual transcripts of phone calls or web data, but can also include more discretely occurring events such as social medial posts, purchases, returns, or warranty claims. Outgoing interactions may use the same channel as the most recent related incoming interaction 102 or may use a different channel from the most recent related incoming interaction 102. For example, a customer may call in with a problem and leave a voicemail. The CSR may reply by calling the customer back over the phone system or may respond to the customer by email, or any other available channel.

The analysis of interactions may include a variety of techniques such as speech analytics, textual analytics of audio communications or textual communications between customers and CSRs, natural language processing, and interaction routing analytics. The analysis may include, but is not limited to, determining the interaction type of the interaction, the time elapsed between interactions in a conversation, the amount of transfers the incoming interaction 102 has gone through, the amount of transfers the incoming interaction 102 and all related previous incoming interactions 102 have gone through. MAS software component may also identify interactions with red flag features, such as prohibited words, phrases, or expressions. Such red flag features, offensive sentiment, tone, or word choice, or grammatical or spelling errors in interactions are indicated as part of the created interaction metadata. The MAS may or may not consider the relation metadata 104 when performing the analysis. Further the MAS software component may have a different set of analytics for incoming interactions 102 and agent actions 106, but may also use the same set of analytics.

Interaction metadata 114 may include, but is not limited to, the type of interaction, the duration of time between the current interaction and the previous related interaction, the sentiment, tone, and/or word choice of the sender, intent and/or meaning of the interaction, presence of threats, and/or a list of business entities referenced in the interaction, customer information related to the interaction, CSR information related to the interaction. By way of non-limiting example, the list of business entities referenced by interactions may include at least one of a policy, an account, a customer, an involved or associated third party, and/or other parties identified in interactions. Interaction metadata 114 may also include, the total number of interactions in the conversation of the current incoming interaction 102, the total number of agent actions 106 in the conversation of the current incoming interaction 102, the total number of incoming interactions 102 in the conversation of the current incoming interaction 102, the skill type necessary to assist the incoming interaction 102, the sentiment 126 assigned to the prior incoming interactions 102 and agent actions 106 for the conversation of the current incoming interaction, the amount of time between an incoming interaction 102 and an agent action 106 related to the incoming interaction 102, the number of times an incoming interaction 102 has been routed to a different CSR, which could be the number of times the current incoming interaction 102 has been routed, but could also include a combination of the number of times the current incoming interaction 102 has been routed along with the number of times any previous related incoming interactions 102 have been routed. Interaction metadata 114 may also include customer identification, CSR identification and other statistical data about the customer or CSR involved in the interaction. In certain embodiments, the intent/type of the interaction is expressed as a list of action points ordered by importance or urgency.

The MAS unit 110 also determines if a conversation has ended by analyzing the received incoming interaction 102 and received agent action 106 and determining if there is likely to be a follow-up response in the form of a new agent action 106 and/or a new incoming interaction 102.

There are a number of ways that the MAS unit 110 can determine a conversation is concluded. In one embodiment, the MAS unit 110 may determine that a conversation is ended based on predetermined criteria 116. The predetermined criteria 116 are rules that when compared to the incoming interaction 102, agent action 106, and/or interaction metadata 114 will determine if the conversation is concluded or if there is likely to be more interactions that are part of the conversation. For example, predetermined criteria 116 may include determining that the conversation is concluded if the last agent action 106 is a null action. In another example, predetermined criteria 116 may include determining that the conversation is concluded if the last interaction in a conversation is an agent action 106 without receiving an incoming interaction 102 in response after a determined amount of time (this time could be minutes, hours, days and may depend on the channel being used for the conversation). In another embodiment, the MAS unit 110 may determine that a conversation is concluded by analyzing the last received interaction or analyzing all of the interactions in the conversation thus far. For example, perhaps the last interaction is from the client and says, "thank you, this has solved my problem." The MAS unit 110 may analyze the content of the interaction and determine that the conversation is concluded because the client has indicated the problem is solved. As another example, the last interaction may be an agent action 106 where the CSR tells the client to try something and call the CSR back. In this example, the system may analyze the content of the interaction and determine that there is likely to be another incoming interaction 102 related to this conversation. In a further embodiment, the system may use both analysis of the interactions in combination with predetermined criteria 116 to determine whether a conversation is concluded. Using the example where the CSR tells the client to call back after trying a potential solution, the system may originally determine there is likely to be additional interactions in the conversation; however, if the client does not call/text back within a prescribed time period, the predetermined criteria 116 may override the original determination and determine that the conversation is closed. It should be understood that these are just examples of how the system can determine if the conversation is concluded and should not be considered limiting. In other embodiments, the CSR may determine that the conversation is concluded based on his/her interpretation that the issue of the conversation has been resolved or is ended. While the system and/or the CSR may determine that a conversation is over, a conversation can still be added to at a later time if the system and/or CSR determines that a new interaction is received that should be related to the ended conversation.

CEC system 100 includes a SAE unit 120 having a SAE software component 121 and an optional SAE storage 122. SAE unit 120 may be a processor or a combination of a processing system and a storage system. SAE unit 120 receives incoming interactions 102 along with relation metadata 104 associated with the incoming interactions 102 and interaction metadata 114 associated with the incoming interactions 102. The SAE unit 120 analyzes the incoming interactions 102, the associated interaction metadata 106 and optionally the relation metadata 104 using SAE software component 121 based on sentiment criteria 124 to assign sentiment 126 to the incoming interactions 102. Optionally, SAE unit 120 may also pass a copy of the incoming interactions 102, relation metadata 104, interaction metadata 114, and/or sentiment 126 to internal or external SAE storage 122 for permanent or temporary storage. Optionally, the SAE unit 120 may store analyzed incoming interactions 102, relation metadata 104, interaction metadata 114, and sentiment 126 in a conversation database 130 for further analysis.

In embodiments, the SAE unit 120 receives incoming interactions 102, relation metadata 104, and interaction metadata 114 in real-time or near real-time. In embodiments, the SAE unit 120 receives incoming interactions 102, relation metadata 104, and interaction metadata 114 in batches for analysis. In embodiments, the SAE unit 120 receives some incoming interactions 102, relation metadata 104, and interaction metadata 114 in batches and other incoming interactions 102, relation metadata 104, and interaction metadata 114 in real-time or near real-time for immediate processing. For incoming interactions 102 where the sentiment 126 is to be displayed to the agent during the conversation, those incoming interactions 102 and their accompanying data will be received by the SAE unit 120 in real-time or near real-time and processed in real-time or near real-time.

Sentiment criteria 124 may include rules conditioned on incoming interaction 102 analysis and relation metadata 104, and interaction metadata 114. Sentiment criteria 124 may be dynamically updated by the system, or manually updated by a CSR or another party as any of the criteria changes. Depending on incoming interaction 102 analysis, relation metadata 104, interaction metadata 114, and sentiment criteria 124, SAE will determine the sentiment 126 of the incoming interaction 102. In one embodiment, the sentiment 126 for an interaction may be positive, negative, or neutral. In other embodiments, the sentiment 126 of the incoming interaction 102 may be based on a sliding numerical scale. For example, the highest number may be the most positive and the lowest number may be the most negative, such that on a 10-point scale, an 8 would be fairly positive, a 5 would be neutral, and 3 would be fairly negative. Sentiment analysis can include polar sentiment, emotion detection, intent analysis, aspect-based analysis. In certain embodiments, the intent of the incoming interaction 102 is expressed as a list of action points ordered by importance or urgency. By way of non-limiting example, the SAE software component 121 may determine, based on the sentiment criteria 124 and analysis, that many misspelled words in an incoming interaction 102 indicating frustration and determine that the sentiment 126 is negative or frustrated or unhappy. However, based on the sentiment criteria 124 and analysis, the SAE software component 121 may determine that many misspelled words in an incoming interaction 102 indicates no bearing on the sentiment 126 of the interaction or indicates a hurried sentiment. It should be understood that these are merely examples of how the system may determine the sentiment of the incoming interaction and should not be considered limiting.

In embodiments, the CEC system 100 may include a conversation database 130 for storing conversations including incoming interactions 102, agent actions 106, relation metadata 104, interaction metadata 114, and sentiment 126. In embodiments, the data to be stored in the conversation database 130 may be received by the conversation database 130 in real-time or near real-time as the interactions are occurring. In embodiments, the data to be stored in the conversation database 130 may be received by the conversation database 130 in batches from the MAS and SAE. The batches received could be based on, for example, when a conversation is determined to be ended or based on a predetermined duration of time elapsed since the last batch, or based on the number of interactions received at the MAS since the last batch, or based on any other criteria for transferring a batch of interactions and related data to the conversation database 130. It should be understood that the above are merely examples of when the system may determine to transfer batches of interactions and interaction data to the conversation database 130 and should not be considered limiting. In embodiments, the data to be stored in the conversation database 130 may be received by the conversation database 130 in a combination of batches and real-time or near real-time. The conversation database 130 stores the interactions and related data in a manner so that entire conversations can be searched and transferred, once the conversation is determined to be complete, to other components of the system including a MAE unit 140.

CEC system 100 includes a MAE unit 140 having a MAE software component 141 and an optional MAE storage 142. MAE unit 140 may be a processor or a combination of a processing system and a storage system. The MAE unit 140 receives conversations, including all related incoming interactions 102, agent actions 106, relation metadata 104, interaction metadata 114, and sentiment 126 for each conversation. The MAE unit 140 analyzes the conversations and incoming interactions 102 of the conversations to determine an interaction type 146 for each incoming interaction 102 and optionally, a conversation type 147 for each conversation. The MAE unit 140 also correlates similar interaction types 146 and analyzes the conversations to determine cause and effect of agent actions 106 on sentiment 126 of the subsequent incoming interaction 102 to determine optimized agent actions. The MAE 140 uses the optimized agent actions and analysis above to create sentiment models 144 and sentiment model statistics 148 based on the interaction type 146 and/or the conversation type 147. Optionally, MAE unit 140 may also pass a copy of the sentiment models 144, interaction types 146, conversation types 147, and/or model statistics 148 to internal or external MAE storage 142 for permanent or temporary storage. Optionally, the MAE unit 140 may store the sentiment models 144, interaction types 146, conversation types 147, and/or model statistics 148 in a conversation database 130 for further analysis.

In embodiments, conversations may be sent to the MAE 140 in real-time or near real-time such that the correlations and modeling are built up slowly. In other embodiments, conversation data may be sent to the MAE 140 in batches. In some embodiments, the conversation data is initially sent to the MAE 140 in batches and then as the sentiment models 144 are built up over time the conversation data is sent to the MAE 140 in real-time or near real-time to dynamically teach the MAE 140 and update the sentiment models 144. The conversations may be passed to the MAE 140 by a conversation database 130 or by the MAS 110 and SAE 120. Each conversation may have a conversation type 147 which will be determined based on the interaction metadata 114 for all interactions of the conversation. Each interaction will have an interaction type 146 which will be determined based on the interaction metadata 114 for the individual interaction.

For each interaction type 146, the MAE 140 will analyze and correlate the cause and effect on client sentiment 126 in the conversation, grouping similar cause/effect pairings for an interaction type 146 together to teach the system which actions 106 for a interaction type 146 are likely to produce a particular type of sentiment 126. In an embodiment, the MAE 140 will analyze coupled agent actions, where the coupled agent action is an agent action 106 paired with the sentiment 126 from the incoming action 102 that immediately precedes the agent action 106 in that conversation. The MAE 140 can analyze all coupled agent actions for a particular interaction type 146 and determine the probable sentiment outcome for each different agent action of that interaction type. Based on this correlation and analysis, the MAE 140 can determine which agent actions are likely to result in a positive sentiment for the interaction type and can determine the probability the desired positive sentiment will be achieved. In some embodiments, the MAE 140 will only teach the system which actions 106 for a interaction type 146 are likely to produce a positive sentiment 126. In other embodiments, the MAE 140 will teach the system which actions 106 for a interaction type 146 are likely to produce all of the different sentiment 126 that the system recognizes. This will enable the system to not only create recommendation sentiment models 144, but will also allow the system to create sentiment models 144 for actions 106 that are not recommended to be undertaken. For example, a certain interaction type 146 may not yet have a sentiment model 144 for recommended actions that will result in a positive sentiment 126, but it may have a sentiment model 144 for actions 106 that will likely result in a negative sentiment 126. In those embodiments, the system can present the agent with actions 126 that are not recommended to be taken. In some embodiments, the MAE 140 may analyze and correlate the cause and effect on client sentiment 126 in the conversation, grouping similar cause/effect pairings based on conversation type 147 and interaction type 146 to teach the system which actions 106 for a conversation type 147 and an interaction type 146 are likely to produce a particular type of sentiment 126.

The correlation, analysis, and modeling can be accomplished in a number of ways. In one embodiment, the system uses natural language processing and collaborative filtering to correlate, analyze, and learn. For example, the collaborative filtering may take the agent actions 106 and add the sentiment analysis of the next incoming interaction 102 (coupled agent action) to determine the agent actions that result in a particular sentiment and to determine whether the sentiment 126 of the next incoming interaction 102 has a change from the previous sentiment 126. For example, the next incoming interaction 102 may have a sentiment improvement, sentiment degradation, or no sentiment change from the sentiment of the previous incoming interaction 102. Using natural language processing, the agent action 106 can be broken down into relevant parts of communication that can be compared across conversations. Breaking down the agent action 106 (CSR reply) into parts, and adding the sentiment analysis of the next incoming interaction 102 (reply from customer) the sentiment improvement or sentiment degradation for this agent action 106 can be calculated. By storing the input and determinations and using collaborative filtering similar agent actions 106 that resulted in the same sentiment or a sentiment change can be found. The actions that resulted in a positive sentiment or a sentiment increase can be incorporated into the sentiment model 144 responses based on the interaction type 146 of the incoming interaction 102 just prior to the agent action 106. To model the prior incoming interaction 102, the same natural language processing can be used to break down the prior incoming interaction 102 into relevant parts of communication that can be compared across conversations and by using the interaction metadata 114 and relation metadata 104 associated with the incoming interaction 102 the incoming interaction 102 can be grouped as similar incoming interactions 102 for a sentiment model 144. The above is described using positive sentiment results, but it should be understood that the same could be achieved for negative sentiment results, neutral sentiment results and any other variation in sentiment.

A sentiment model 144 may include the interaction type 146, conversation type 147, the optimized agent action and the resulting sentiment 126. A sentiment model 144 may also include model statistics 148, including statistics on the incoming interactions 102, original sentiments 126, agent actions 106 and resulting sentiment 126 that have shaped the sentiment model 144. For example, the model statistics may include the number of incoming interaction 102, original sentiments 126, and/or agent actions used in determining the sentiment model 144. As another example, the model statistics 148 may include the sentiment 126 that the optimized agent action is expected to cause. As another example, the model statistics 148 may include all of the agent actions 106 used to build the sentiment model 144. Each agent action 106 is paired with the sentiment 126 connected to the next related incoming interaction 102 for the agent action 106 (a coupled agent action). The sentiment models 144 may be aimed at causing a particular sentiment response and/or a particular sentiment change, such as the next incoming interaction 102 being determined to have a positive sentiment 126 or the next incoming interaction 102 being determined to have a more positive sentiment 126 than the previous incoming interaction 102. However, sentiment models 144 may also be aimed at causing a negative sentiment response and/or negative sentiment change to be provided as warnings for CSRs as to what optimized agent actions not to use for the interaction type 146 and/or conversation type 147.

The sentiment models 144 will dynamically change over time as the MAE receives more conversations. For example, if a client calls with complaint about a product not working as advertised, there are a number of ways a CSR can handle the matter. The CSR can try to demonstrate to the client that it does work as advertised, the CSR could offer the client a refund/return, the CSR could attempt to fix the problem, or the CSR could determine that the matter is one best addressed by a supervisor (among other possible responses). Based on the analysis of the first interaction of this type, the MAE may build a model showing that the attempt to fix the problem resulted in a positive sentiment outcome. However, over time, this response may yield less positive sentiment results and may even yield negative sentiment results. The model for this interaction type and/or conversation type will dynamically change over time to reflect the responses that are most likely to cause the desired sentiment (positive for recommended responses and negative for responses to avoid). In the same type of interaction, over time, it may be determined that referring the matter to a supervisor is always yields positive sentiment. Therefore, the MAE may modify the model for this interaction type and/or conversation type such that referring to a supervisor is the optimized agent action for a positive sentiment response. However, in another type of conversation, the MAE may learn that escalation to a supervisor results in a negative sentiment change. In that type of conversation, the system learns that this response is the least desirable response for the other type of conversation so it may model this response as a response not to take in the second type of conversation. The models may change dynamically based on the analysis of each new conversation for the interaction type and/or conversation type. It is possible there will be multiple models for each interaction type and/or conversation type. However, in some embodiments, it may be desirable to only present the agent with a single model for the desired sentiment.

CEC system 100 includes a RAE unit 150 having a RAE software component 151 and an optional RAE storage 152. RAE unit 150 may be a processor or a combination of a processing system and a storage system. The RAE unit 150 receives incoming interactions 102 and the relation metadata 104, interaction metadata 114, and sentiment 126 for the incoming interaction from the SAE unit 120. In this embodiment, the incoming interaction is received in real-time or near real-time as the conversation is occurring. The RAE also receives sentiment models 144 with their related interaction type 146, conversation type 147, and optionally model statistics 148 from the MAE unit 140. The RAE unit 150 analyzes the incoming interaction 102 along with the interaction metadata 114 and, optionally, relation metadata to determine the interaction type 160 for the new incoming interaction 102. The new incoming interaction 102 may also have a conversation type 147 already associated with it, if it is part of an ongoing conversation that has already been assigned a conversation type. The RAE unit 150 applies the sentiment models 144 to the new incoming interaction 102 to determine the sentiment models 144 that contain the optimized agent action for the new incoming interaction 102 based on recommendation rules 154. Optionally, RAE unit 150 may also pass a copy of the incoming interactions 102 and interaction type 160 to internal or external RAE storage 152 for permanent or temporary storage.

Based on the interaction type 146 and/or conversation type 147 of the new incoming interaction 102, the RAE 150 determines the sentiment models(s) 144 to presented to the agent. The sentiment model(s) 144 to be presented may be the most similar to the new incoming interaction that are likely to result in a positive sentiment and/or the sentiment models most similar to the incoming interaction that is likely to result in a negative sentiment. The sentiment model(s) 144 to be presented to the agent (i.e. positive sentiment, negative sentiment, neutral sentiment, a single sentiment model, multiple sentiment models) is determined by the sentiment models 144 available for the interaction type 146 and/or conversation type 147 and a set of recommendation rules 154. The recommendation rules 154 will determine if only positive sentiment models will be presented, if only negative sentiment models will be presented, if a combination of positive and negative models will be presented, and if numerous models will be presented or only the single most positive or most negative model will be presented.

To determine the sentiment model(s) 144 to be presented the system will apply the same natural language processing used for categorizing the sentiment models 144 on the new incoming interactions 102 and their associated metadata 104 and 114. By using the same natural language processing, parts of the incoming interaction 102 can be compared to the existing sentiment models 144 and the system can predict the sentiment model 144 with an optimized agent action 160 that will likely result in a certain sentiment or a certain sentiment change.

CEC system 100 also includes at least one CSR desktop 170 used by the CSR for viewing sentiment 126 for the current initial interaction 102 and for viewing sentiment models 144 for the current initial interaction 102. Optionally, the RAE 150 will also display the sentiment model(s) 144 applied to the optimized agent action(s) including the interaction type 146, conversation type 147, and model statistics 148. CEC desktop 170 may also receive input for updating recommendation rules 154, sentiment criteria 124, predetermined criteria 116 and receives input of the agent action 106 taken by the CSR.

Figure 2:
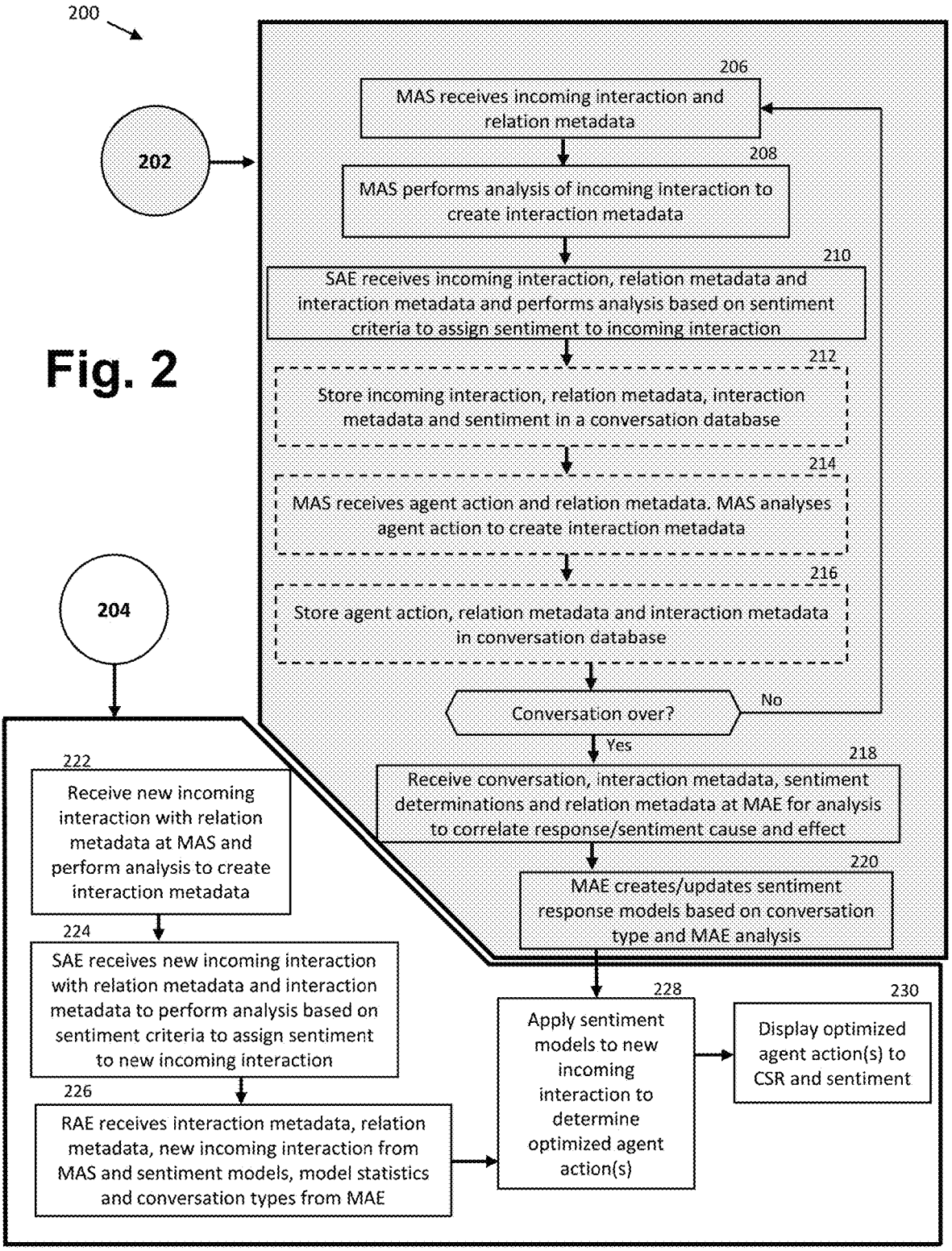
FIG. 2 depicts a flowchart of an exemplary embodiment of a method of creating sentiment models based on machine learning and determining an optimized agent action for new interactions by applying the sentiment models.

FIG. 2 depicts a flowchart of an exemplary embodiment of method 200 for providing CSRs with real-time sentiment for incoming interactions and creating sentiment models based on machine learning and determining optimized agent action(s) for new interactions by applying the sentiment models.

The flowchart of FIG. 2 can generally be separated into two portions, a training portion 202 in which sentiment models are created, and an application portion 204 in which automated guidance is provided based on application of the sentiment models to new interactions. It should be understood that the training portion 202 may occur concurrently and near simultaneously to the application portion 204 wherein the system uses the same incoming interaction to both train the system and receive automated guidance. It should further be understood that the training portion 202 may occur separate from the application portion 204 such that the training portion 202 may receive a batch set of conversations to feed into the system, determine the sentiment for each incoming interaction and analyze the batch conversations and sentiment to teach the system. It should further be understood that the system may implement a combination of the concurrent and batch teaching. The concurrent teaching may occur in real-time such that the next new incoming interaction received by the system will apply the current sentiment models which would include the analysis of the incoming interaction immediately preceding the new incoming interaction.

Starting with the training portion 202, at step 206, the MAS 110 receives an incoming interaction 102 and associated relation metadata 104 from outside the system that is part of a conversation. The conversation may be a new conversation, where the incoming interaction 102 is not related to any other prior interaction, or part of an ongoing conversation, where the incoming interaction 102 is related to at least one other interaction (either an incoming interaction 102 or an agent action 106).

At step 208, the MAS 110 analyzes the incoming interaction 102 and relation metadata 104 to create interaction metadata 114 for the incoming interaction 102. The system may use the created interaction metadata 114 to assist with the determination of relation metadata 104 and update the relation metadata 104.

The analysis of interactions may include a variety of techniques such as speech analytics, textual analytics of audio communications or textual communications between customers and CSRs, natural language processing, and interaction routing analytics. The analysis may include, but is not limited to, determining the interaction type of the interaction, the time elapsed between interactions in a conversation, the amount of transfers the incoming interaction 102 has gone through, the amount of transfers the incoming interaction 102 and all related previous incoming interactions 102 have gone through. MAS software component 111 may also identify interactions with red flag features, such as prohibited words, phrases, or expressions. Such red flag features, offensive sentiment, tone, or word choice, or grammatical or spelling errors in interactions are indicated as part of the created interaction metadata 114. The MAS 110 may or may not consider the relation metadata 104 when performing the analysis. Further the MAS software component may have a different set of analytics for incoming interactions 102 and agent actions 106, but may also use the same set of analytics.

At step 210, the incoming interaction 102, relation metadata 104, and interaction metadata 114 are sent to a SAE 120 where the incoming interaction 102, relation metadata 104, and/or interaction metadata 114 are analyzed to determine the sentiment 126 of the incoming interaction 102 based on sentiment criteria 124.

At step 212, the SAE 120 sends the incoming interaction 102 to a conversation database 130 for storage. Optionally, the SAE 120 sends the interaction metadata 114, the relation metadata 104, and/or the sentiment 126 to the conversation database 130.

At step 214, ideally, the MAS 110 receives an agent action 106 and corresponding relation metadata 104 in response to the incoming interaction 102. The MAS 110 analyzes the agent action 106 and relation metadata 104 to create interaction metadata 114. It should be noted that, while it is desired that all incoming interactions 102 will be responded to with an agent action 106, even if it is just a null agent action 106 indicating that the is no need for an agent action, it is possible that not all incoming interactions 102 will be followed by an agent action 106. Further, it should also be noted that some agent actions 106 may involve more than one outgoing action and/or other action in a row. If there is no intervening incoming interaction 102 between the agent actions 106, the system will consider and analyze those outgoing interactions and other actions together as a whole At step 216, the MAS 110 sends the agent action 106 to a conversation database 130 for storage. Optionally, the MAS 110 sends the interaction metadata 104, and/or the relation metadata 114 to the conversation database 130.

If the conversation is not ended, steps 206-216 will repeat until the conversation is concluded. As disclosed above, there are a number of ways that the system can determine a conversation is concluded. While the system and/or the CSR may determine that a conversation is over, which triggers the correlation analysis steps 218-220, a conversation can still be added to at a later time if the system and/or CSR determines that a new interaction is received that should be related to the ended conversation. Adding to an ended conversation will reopen the conversation for processing in steps 206-216 until the conversation is ended again, which will again trigger further processing starting with step 218.

Once the conversation is ended, in step 218, a MAE 140 will receive the conversation, including all related incoming interactions 102, related agent actions 106, interaction metadata 114, sentiment determinations 126, and relation metadata 104 for correlation and analysis.

At step 220, the MAE 140 creates and updates sentiment models 144 for incoming interactions 102 based on interaction type 146 and/or conversation type 147 and the analysis and correlation in step 218.

Once models are established, they can be used in the application portion 204 as shown in FIG. 2. In the application portion 204, the sentiment models 144 are applied to new incoming interactions 102 in order to provide CSRs with optimized agent actions that the MAE 140 has learned create a specific sentiment response in similar incoming interactions. The sentiment response may be positive, negative, or neutral.

At step 222, a new incoming interaction 102 along with its relation metadata 104 is received at the MAS 110 for analysis similar to step 208, to create interaction metadata 114.

At step 224, the new incoming interaction 102 along with its relation metadata 104 and interaction metadata 114 is received at the SAE 120 for analysis and determination of sentiment 126.

At step 226, the new incoming interaction 102 along with its related sentiment 126, interaction metadata 114, and relation metadata 104 are received at a RAE 150. The RAE 150 also receives the sentiment models 144, model statistics 148, and their interaction types 146 and/or conversation types 147 form the MAE 140.

At step 228, the RAE 150 applies the sentiment models 144 to the new incoming interaction 102 and determines which sentiment model(s) 144 should be provided to the agent based on recommendation rules 154.

At step 230, the RAE 150 provides the sentiment 126 for the new incoming interaction 102 and the selected sentiment model(s) 144 to the CSR. Depending on the recommendation rules 154, in some embodiments, the RAE may only provide positive sentiment models to the CSR. In some embodiments, the RAE may provide only negative sentiment models to the CSR or a combination of positive and negative optimized agent actions. In some embodiments, in addition to the sentiment models, the RAE may also provide additional information for those sentiment models such as the interaction type 146, conversation type 147, the sentiment 126 of optimized agent action and statistics 148 on the incoming interactions, original sentiments, agent actions and resulting sentiment that have shaped the model.

While steps 222-226 are being carried out for a new incoming interaction, steps 206-220 may also be carried out for the same new interaction such that the system can learn if the optimized agent action achieves the desired outcome and will assess in developing the sentiment models. This enables the system to constantly learn from its optimized agent actions and dynamically update the models based on the results.

In various embodiments, steps 206 through 220 are carried out simultaneously to steps 222 through 230 for the same incoming interaction 102.

Figure 3:
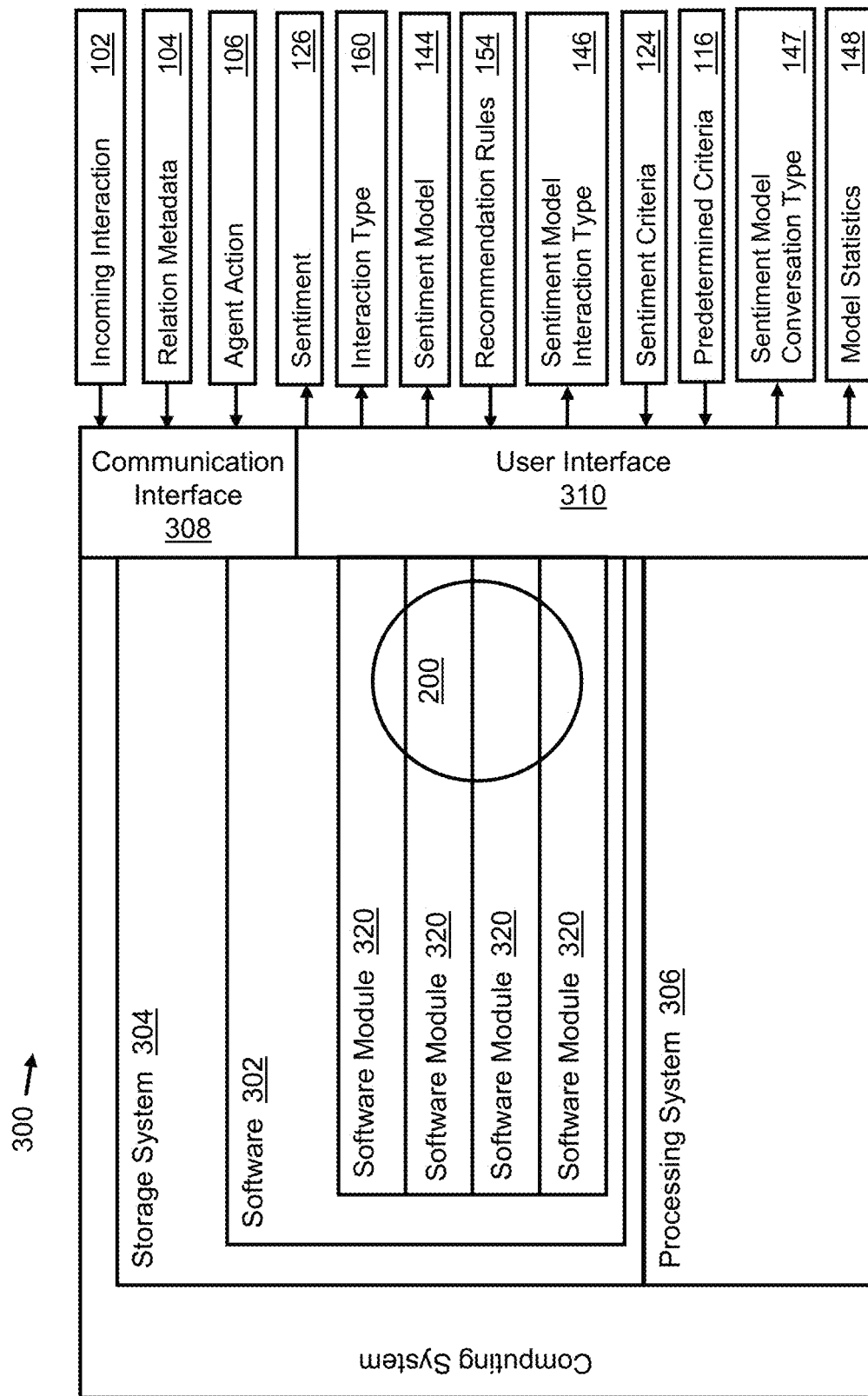
FIG. 3 depicts an exemplary embodiment of a system for creating sentiment models based on machine learning and determining an optimized agent action for new interactions by applying the sentiment models.

FIG. 3 depicts an exemplary embodiment of a system 300 for determining and displaying sentiment in real-time or near real-time to agents for incoming interactions, creating sentiment models based on machine learning and determining an optimized agent action for new interactions by applying the sentiment models.

System 300 is a computing system that includes a processing system 306, a storage system 304, software 302, a communication interface 308, and a user interface 310. Processing system 306 loads and executes software 302 from the storage system 304, including at least one software component 320. When executed by computing system 300, software component 320 directs the processing system 306 to operate as described herein in further detail in accordance with the method 200. Computing system 300 is a specialized system specifically designed to perform the steps and actions necessary to execute method 200 and system 100. While some of the component options for computing system 300 may include components prevalent in other computing systems, computing system 300 is a specialized computing system capable of performing the steps and processes described herein.

Computing system 300 includes four software components 320 for performing the functions of MAS software component 111, SAE software component 121, MAE software component 141, and RAE software component 151. Although computing system 300 as depicted in FIG. 3 includes four software components 320 in the present example, it should be understood that one or more components could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include central processing units, application specific processors, and logic devices, as well as any other type of processing device, combinations of processing devices, or variations thereof.

While there are a number of processing devices available to comprise the processing system 306, the processing devices used for the processing system 306 are particular to this system and must specifically be capable of performing the processing necessary to execute method 200 and support system 100.

The storage system 304 can comprise any storage media readable by processing system 306, and capable of storing software 302 that is able to meet the needs of the specific computing system 300 and execute the storage required for method 200 and system 100. The storage system 304 may include volatile and non-volatile, removable and non-removable media implemented in any method or technology for storage of information, such as computer readable instructions, data structures, program modules, or other data. Storage system 304 may be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300. While many types of storage media may be incorporated into system 300, the storage media used must be specialized to the purpose of executing the storage requirements of method 200 and system 100 as described herein.

User interface 310 can include one or more CEC desktops 170, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display initial interactions 102, relation metadata 104, interaction metadata 114, sentiment 126, interaction type for the current incoming interaction 160, sentiment models 144, interaction type for the sentiment model 146, conversation type for the sentiment model 147, model statistics 148, CEC desktop 170, or another interface further associated with embodiments of the system and method as disclosed herein. Speakers, printers, haptic devices and other types of output devices may also be included in the user interface 310. A CSR or other staff can communicate with computing system 300 through the user interface 310 in order to view initial interactions 102, relation metadata 104, interaction metadata 114, sentiment 126, interaction type for the current incoming interaction 160, sentiment models 144, interaction type for the sentiment model 146, conversation type for the sentiment model 147, model statistics 148, update predetermined criteria 116, update sentiment criteria 124, update recommendation rules 154, input an agent action 106, or any number of other tasks the CSR or other staff may want to complete with computing system 300.

As described in further detail herein, computing system 300 receives and transmits data through communication interface 308. In embodiments, the communication interface 308 operates to send and/or receive data, such as, but not limited to, incoming interactions 102, agent actions 106 and relation metadata 104 to/from other devices and/or systems to which computing system 300 is communicatively connected, and to receive and process conversations as described in greater detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for processing conversations to provide continuous sentiment analysis and optimized agent actions, comprising:
receiving an incoming interaction, wherein the incoming interaction is part of a conversation; performing a MAS analysis of the incoming interaction using a metadata analytics service (MAS) software module on a MAS;
generating interaction metadata for the incoming interaction based on the MAS analysis; passing the incoming communication and the interaction metadata associated with the incoming interaction to a sentiment analysis engine (SAE);
performing a SAE analysis of the incoming interaction using a SAE software module based on the interaction metadata and a set of sentiment criteria;
assigning a sentiment to the incoming interaction based on the SAE analysis; receiving an agent action in response to the incoming interaction, wherein the agent action is part of the conversation;
performing an agent MAS analysis of the agent action using the MAS software module on the MAS;
generating interaction metadata for the agent action based on the agent MAS analysis; continuing to receive and analyze additional incoming interactions and additional agent actions, wherein the additional incoming interactions and the additional agent actions are part of the conversation, until the conversation is ended;
receiving the conversation at a model analysis engine (MAE), when the conversation is ended;
performing a model analysis of the agent actions from the conversation along with the sentiment assigned to the incoming interactions from the conversation to correlate agent actions and corresponding sentiment to at least one of a plurality of interaction types;
creating at least one sentiment model for each interaction type represented in the conversation that does not already have a sentiment model based on the model analysis, wherein the sentiment model includes at least one optimized agent action and one of the interaction types;
updating the sentiment models for each interaction type represented in the conversation based on the model analysis;
receiving, at a recommendation analysis engine (RAE), a new incoming interaction along with associated sentiment for the new incoming interaction;
receiving the at least one sentiment model at the RAE;

applying the at least one sentiment model to the new incoming interaction to determine an optimized agent action; and displaying to a customer service representative the sentiment for the new incoming interaction and the determined optimized agent action.

2. The method of claim 1, wherein the incoming interaction and the agent action includes relation metadata, wherein the relation metadata includes a set of information defining how the incoming interaction and the agent action are related to other incoming interactions and other agent actions of the conversation.

3. The method of claim 1, wherein the interaction metadata includes a determination of at least one interaction type for the incoming interaction.

4. The method of claim 1, the method further comprising determining an end of the conversation by analyzing the incoming interaction and the agent action.

5. The method of claim 1, the method further comprising determining at least one interaction type for the incoming interaction based on an analysis of the incoming interaction and the interaction metadata.

6. The method of claim 1, the method further comprising determining at least one conversation type for the conversation based on an analysis of the incoming interactions for the conversation and the agent actions for the conversation.

7. The method of claim 1, wherein the sentiment model only includes agent actions for the interaction type that results in a positive sentiment.

8. The method of claim 1, wherein the sentiment model only includes agent actions for the interaction type that results in a negative sentiment.

9. The method of claim 1, wherein the sentiment is one of positive, negative, or neutral.

10. The method of claim 9, wherein the at least one optimized agent action for each sentiment model is the agent action most likely to yield a specific sentiment for the interaction type.

11. An automated computer system for automatedly providing continuous sentiment analysis and optimized agent actions, comprising: a processor;
a display with a user interface to display a sentiment for a new incoming interaction and at least one determined optimized agent action to a customer service representative (CSR); and
a non-transitory computer readable medium programmed with computer readable code that upon execution by the processor causes the processor to:
receive an incoming interaction, wherein the incoming interaction is part of a conversation,
perform a MAS analysis of the incoming interaction using a metadata analytics service (MAS) software module on a MAS, generate interaction metadata for the incoming interaction based on the MAS analysis,
pass the incoming communication and the interaction metadata associated with the incoming interaction to a sentiment analysis engine (SAE), perform a SAE analysis of the incoming interaction using a SAE software module based on the interaction metadata and a set of sentiment criteria, assign a sentiment to the incoming interaction based on the SAE analysis, receive an agent action in response to the incoming interaction, wherein the agent action is part of the conversation,
perform an agent MAS analysis of the agent action using the MAS software module on the MAS,
generate interaction metadata for the agent action based on the agent MAS analysis,
continue to receive and analyze additional incoming interactions and additional agent actions, wherein the additional incoming interactions and the additional agent actions are part of the conversation, until the conversation is ended,
receive the conversation at a model analysis engine (MAE), when the conversation is ended,
perform a model analysis of the agent actions from the conversation along with the sentiment assigned to the incoming interactions from the conversation to correlate agent actions and corresponding sentiment to at least one of a plurality of interaction types,
create at least one sentiment model for each interaction type represented in the conversation that does not already have a sentiment model based on the model analysis, wherein the sentiment model includes at least one optimized agent action and one of the interaction types, update the sentiment models for each interaction type represented in the conversation based on the model analysis, receive, at a recommendation analysis engine (RAE), a new incoming interaction along with associated sentiment for the new incoming interaction, receive the at least one sentiment model at the RAE,
apply the at least one sentiment model to the new incoming interaction to determine an optimized agent action, and
display to a customer service representative the sentiment for the new incoming interaction and the determined optimized agent action.

12. The system of claim 11, wherein the incoming interaction and the agent action includes relation metadata, wherein the relation metadata includes a set of information defining how the incoming interaction and the agent action are related to other incoming interactions and other agent actions of the conversation.

13. The system of claim 11, wherein the interaction metadata includes a determination of at least one interaction type for the incoming interaction.

14. The system of claim 11, wherein execution of the non-transitory computer readable medium further causes the processor to determine an end of the conversation by analyzing the incoming interaction and the agent action.

15. The system of claim 11, wherein execution of the non-transitory computer readable medium further causes the processor to determine at least one interaction type for the incoming interaction based on an analysis of the incoming interaction and the interaction metadata.

16. The system of claim 11, wherein execution of the non-transitory computer readable medium further causes the processor to determine at least one conversation type for the conversation based on an analysis of the incoming interactions for the conversation and the agent actions for the conversation.

17. The system of claim 11, wherein the sentiment model only includes agent actions for the interaction type that results in a positive sentiment.

18. The system of claim 11, wherein the sentiment model only includes agent actions for the interaction type that results in a negative sentiment.

19. The system of claim 11, wherein the at least one optimized agent action for each sentiment model is the agent action most likely to yield a specific sentiment for the interaction type.

20. A non-transitory computer readable medium programmed with computer readable code that upon execution by a processor causes the processor to execute a method for automatedly providing continuous sentiment analysis and optimized agent actions, comprising:

receiving an incoming interaction, wherein the incoming interaction is part of a conversation; performing a MAS analysis of the incoming interaction using a metadata analytics service (MAS) software module on a MAS;

generating interaction metadata for the incoming interaction based on the MAS analysis; passing the incoming communication and the interaction metadata associated with the incoming interaction to a sentiment analysis engine (SAE);

performing a SAE analysis of the incoming interaction using a SAE software module based on the interaction metadata and a set of sentiment criteria;

assigning a sentiment to the incoming interaction based on the SAE analysis; receiving an agent action in response to the incoming interaction, wherein the agent action is part of the conversation;

performing an agent MAS analysis of the agent action using the MAS software module on the MAS;

generating interaction metadata for the agent action based on the agent MAS analysis; continuing to receive and analyze additional incoming interactions and additional agent actions, wherein the additional incoming interactions and the additional agent actions are part of the conversation, until the conversation is ended;

receiving the conversation at a model analysis engine (MAE), when the conversation is ended;

performing a model analysis of the agent actions from the conversation along with the sentiment assigned to the incoming interactions from the conversation to correlate agent actions and corresponding sentiment to at least one of a plurality of interaction types;

creating at least one sentiment model for each interaction type represented in the conversation that does not already have a sentiment model based on the model analysis, wherein the sentiment model includes at least one optimized agent action and one of the interaction types;

updating the sentiment models for each interaction type represented in the conversation based on the model analysis;

receiving, at a recommendation analysis engine (RAE), a new incoming interaction along with associated sentiment for the new incoming interaction;

receiving the at least one sentiment model at the RAE;

applying the at least one sentiment model to the new incoming interaction to determine an optimized agent action; and displaying to a customer service representative the sentiment for the new incoming interaction and the determined optimized agent action.

* * * * *